Figure 2:
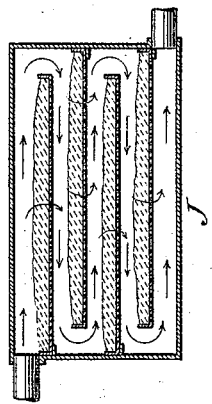

(No Model.)

T. L. WILLSON.
PROCESS OF AND APPARATUS FOR MAKING GAS.

No. 542,320. Patented July 9, 1895.

WITNESSES:
C. E. Ashley
H. W. Lloyd.

INVENTOR:
Thomas L. Willson,
By his Attorneys,
Arthur E. Fraser & Co.

UNITED STATES PATENT OFFICE.

THOMAS L. WILLSON, OF NEW YORK, N. Y.

PROCESS OF AND APPARATUS FOR MAKING GAS.

SPECIFICATION forming part of Letters Patent No. 542,320, dated July 9, 1895.

Application filed May 9, 1895. Serial No. 548,689. (No model.)

*To all whom it may concern:*

Be it known that I, THOMAS L. WILLSON, a citizen of the United States, residing in the city, county, and State of New York, have invented certain new and useful Improvements in the Treatment of Illuminating-Gas, of which the following is a specification.

Ordinary illuminating-gas, in the condition in which it passes into the main or distributing-pipe, holds in suspension more or less aqueous vapor, and in its passage through the mains, which, being laid under ground, are maintained at a low temperature, these vapors are condensed, thus giving rise to the annoyance of the accumulation of water at low levels in the mains. My present invention aims to prevent this condensation, or to reduce it to so insignificant an amount as to occasion no practical difficulty. There is an accompanying condensation with ordinary illuminating gas of certain condensible hydrocarbons; but with condensation of this nature my present invention is not concerned.

My invention is based upon the property possessed by calcium carbide ($CaC_2$) of decomposing water and thereby generating acetylene gas. So great is the affinity of this carbide for water that it undergoes decomposition in the air with continual evolution of acetylene. The same property is also possessed by some other metallic carbides, as, for example, barium carbide, though in less degree. There are other metallic carbides, such as aluminium carbide, which do not possess any affinity for water, and with these my invention is not concerned.

According to my invention, I take, for example, ordinary coal-gas, or a gas produced from any hydrocarbons by destructive distillation, and after it has been purified in any ordinary manner, and before it is passed into the mains, I bring it into close and repeated contact with calcium carbide, (or any other metallic carbide having the power of decomposing water,) whereby the moisture in the gas is taken up by the carbide, with an accompanying decomposition of the latter, to generate a hydrocarbon gas, which gas, in the case of calcium carbide, is acetylene. By this means the illuminating-gas, at the instant before it enters the mains, is thoroughly dehydrated, so that it contains no aqueous matter which can be precipitated in the mains, or at least not enough to occasion annoyance. At the same time the acetylene gas which is generated from the carbide commingles with the illuminating-gas, and by being itself a high illuminant serves to enrich the gas or increase its illuminating power. Thus, at one operation, two very desirable results are produced—namely: The gas is dried and its illuminating power is increased.

Figure 1:
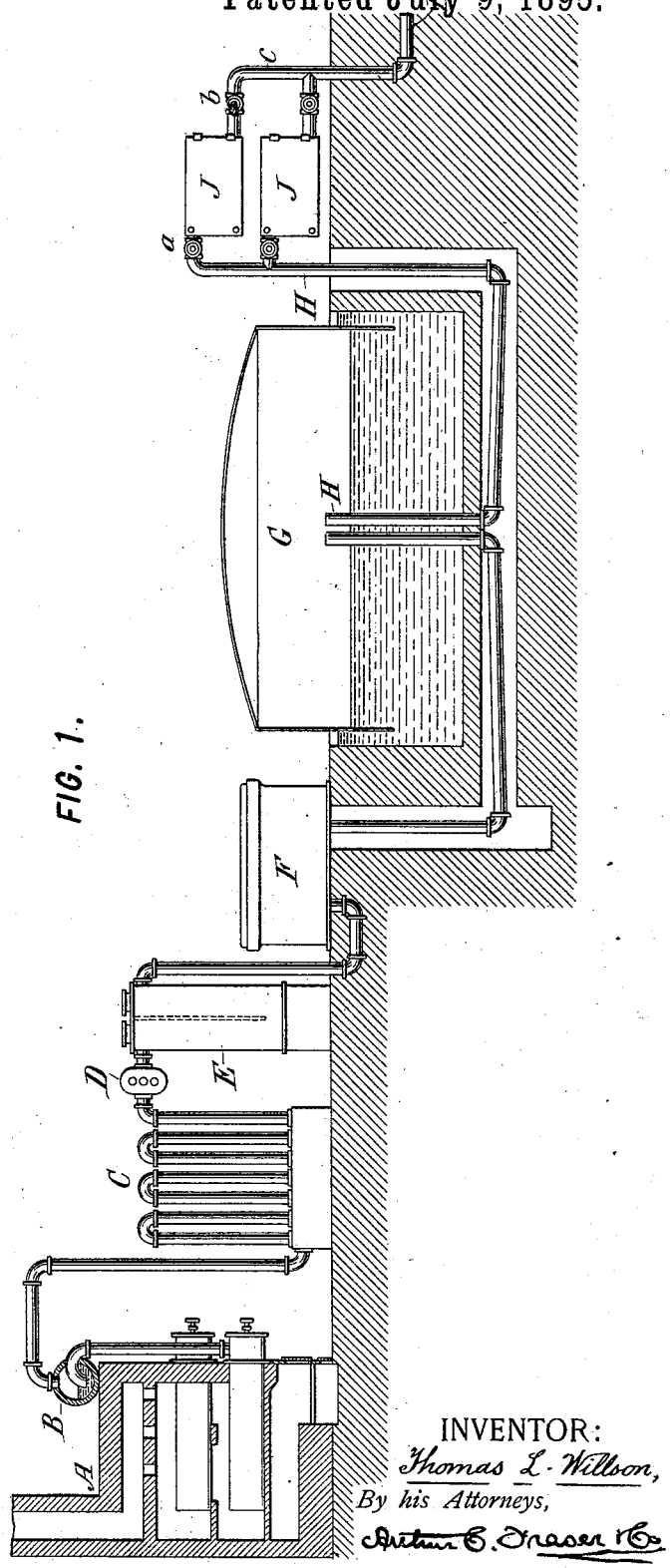

In the accompanying drawings, Figure 1 is a sectional elevation illustrating the combination of apparatus employed for producing gas from coal, to which are added two carbide-dehydrators for practicing my present invention. Fig. 2 is a section of one of these dehydrators on a larger scale.

Referring to the drawings, let A A designate the retorts; B, the hydraulic main; C, the condenser; D, the gas-exhauster; E, the scrubber; F, the lime or other purifier, and G the gas-holder. These apparatus are or may be of any usual or known construction, being unaffected by my invention.

From the gas-holder the gas is taken out by a pipe H, which, instead of conducting it directly into the main, conducts it to one or more carbide-dehydrators, which, as a whole, are lettered J J, and of which two are shown in the drawings, although any number, from one up, may be used. These dehydrators may be of any construction whatever, whereby calcium carbide may be exposed in the path of flow of the gas, so that the latter shall be brought into intimate contact with the carbide. In the construction shown the dehydrators consist each of a casing or shell constituting a chamber in which are placed alternated trays containing the carbide, the latter being preferably in lumps or pieces of, for example, about the size of walnuts, and the trays being so arranged as to cause the gas to flow back and forth in alternation, so as to come into extended contact with the material on all of the trays, and the bottoms of the trays also being perforated, in order that some of the gas may be drawn directly through the tray by passing through the interstices between the lumps of carbide. The casing is constructed so that it may be opened to remove the trays and renew the carbide when necessary. Each dehydrator receives the gas through an inlet-pipe furnished with a controlling-valve $a$, and the gas passes out through an outlet-pipe furnished with a valve $b$. By means of these valves any one of the dehydrators may be disconnected for the purpose of renewing its carbide. In the case of two or more dehydrators, the pipe H distributes the gas to those dehydrators that are in action, and the gas issuing from their outlet-pipes is conducted by a pipe $c$ to the main or distributing pipe, lettered K, and which is shown as an underground pipe.

The purpose of introducing the dehydrators between the gas-holder and the mains is that, however free from moisture the gas may be when it enters the gas-holder, it is liable to absorb more or less moisture from the water used to seal the gas in the holder, and by arranging the dehydrators to act upon the gas as it flows from the holder this moisture is taken up by the carbide.

My present application for patent is not intended to claim broadly the dehydration of an illuminating-gas by passing it into contact with calcium carbide, as such matter is claimed in my application, Serial No. 545,466, filed April 12, 1895.

My present application is intended to claim specifically the dehydration of an illuminating-gas between the gas-holder and the main, and especially the dehydration and enrichment of coal-gas by this means.

I claim as my invention the following defined novel features, substantially as hereinbefore specified, namely:

1. The improved treatment of illuminating gas which consists in passing it, after it has been purified, and before it enters the mains, into contact with a metallic carbide decomposable by water to generate a hydrocarbon gas, whereby the gas is dehydrated and enriched.

2. The improved treatment of illuminating gas which consists in passing it on its way from the gas holder into the main into contact with a metallic carbide decomposable by water to generate a hydrocarbon gas, whereby the gas is dehydrated and enriched.

3. The combination with gas-generating and purifying apparatus and a gas-holder, of a carbide dehydrator substantially as described introduced to be traversed by the gas between the gas holder and the main.

In witness whereof I have hereunto signed my name in the presence of two subscribing witnesses.

THOMAS L. WILLSON.

Witnesses:
GEORGE H. FRASER,
CHARLES K. FRASER.